United States Patent [19]
Miyauchi

[11] Patent Number: 5,689,567
[45] Date of Patent: Nov. 18, 1997

[54] ELECTRONIC SIGNATURE METHOD AND APPARATUS

[75] Inventor: Hiroshi Miyauchi, Tokyo, Japan

[73] Assignee: NEC Corporation, Tokyo, Japan

[21] Appl. No.: 742,446

[22] Filed: Nov. 1, 1996

Related U.S. Application Data

[63] Continuation of Ser. No. 364,042, Dec. 27, 1994, abandoned.

[30] Foreign Application Priority Data

Dec. 27, 1993 [JP] Japan .................. 5-330558

[51] Int. Cl.$^6$ .................................................. H04K 1/00
[52] U.S. Cl. .................. 380/25; 380/45; 380/30; 380/23
[58] Field of Search .................. 380/25, 45, 30, 380/23

[56] References Cited

U.S. PATENT DOCUMENTS

| | | | |
|---|---|---|---|
| 4,405,829 | 9/1983 | Rivest et al. | 380/30 |
| 4,879,747 | 11/1989 | Leighton et al. | 380/23 |
| 5,005,200 | 4/1991 | Fischer | 380/30 |
| 5,355,411 | 10/1994 | MacDonald | 380/23 |
| 5,465,299 | 11/1995 | Matsumoto et al. | 380/23 |

OTHER PUBLICATIONS

Ford, Computer Communications Security, Principles, Standard Protocols and Techniques, pp. 64–85, (1994).

Ikeno et al., "Theory Of Modern Cryptographic Techniques", The Institute of Electronics, Information and Communications Engineers, Japan, (1986).

Primary Examiner—Thomas H. Tarcza
Assistant Examiner—Pinchus M. Laufer
Attorney, Agent, or Firm—Foley & Lardner

[57] ABSTRACT

Electronic signature apparatus and method provide an electronic signature that can be created only by a signer, but cannot be used for other than the signature object document to be processed, and that can be verified and authenticated as an image. Since the verified result is an image, such as a print of a seal and a signature, the verifier can easily verify the validity of the image. In addition, since a signature image and a signature object document may separately be processed, combined, and decomposed upon decryption, they can effectively be used for a printed signature.

14 Claims, 3 Drawing Sheets

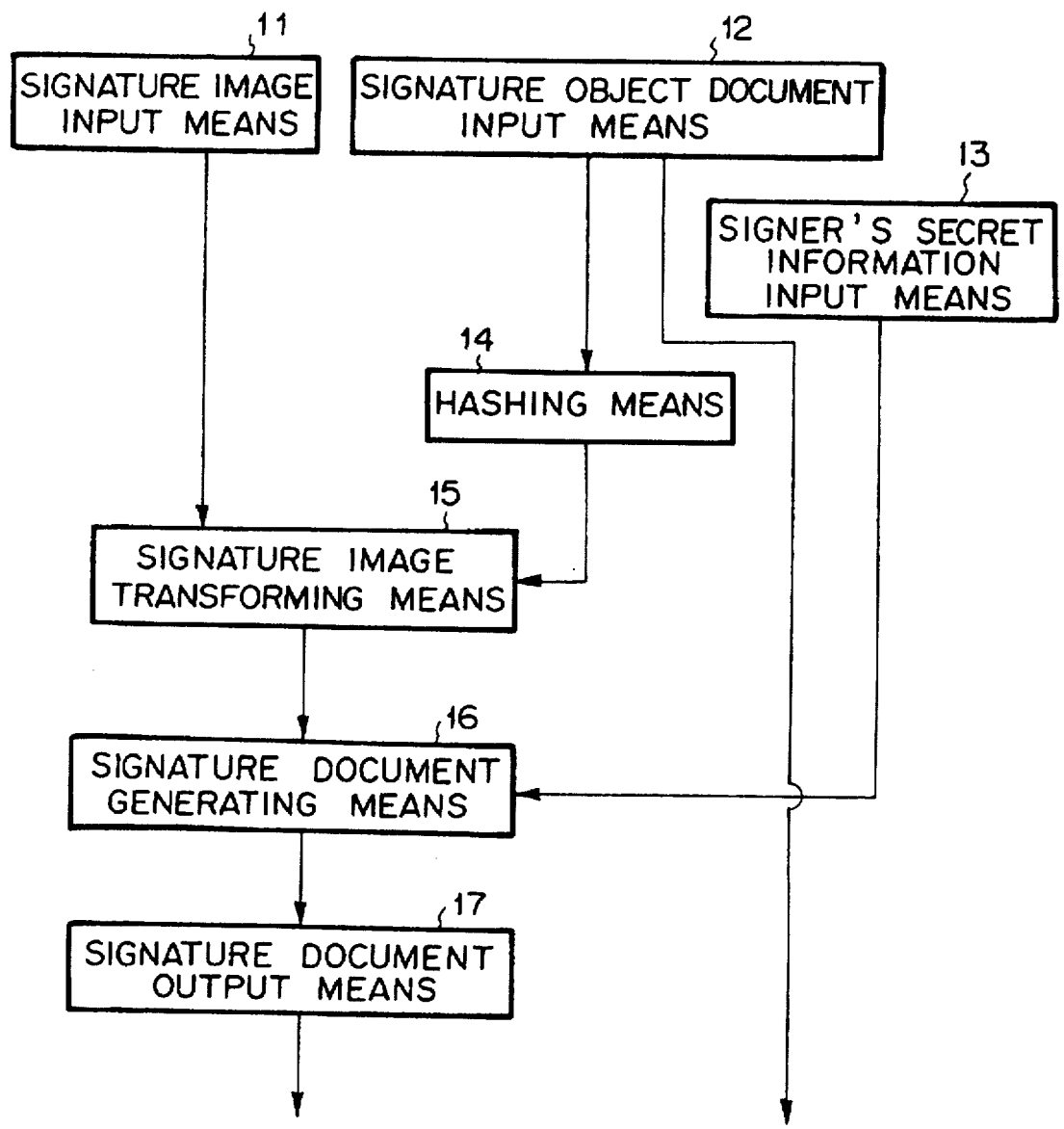

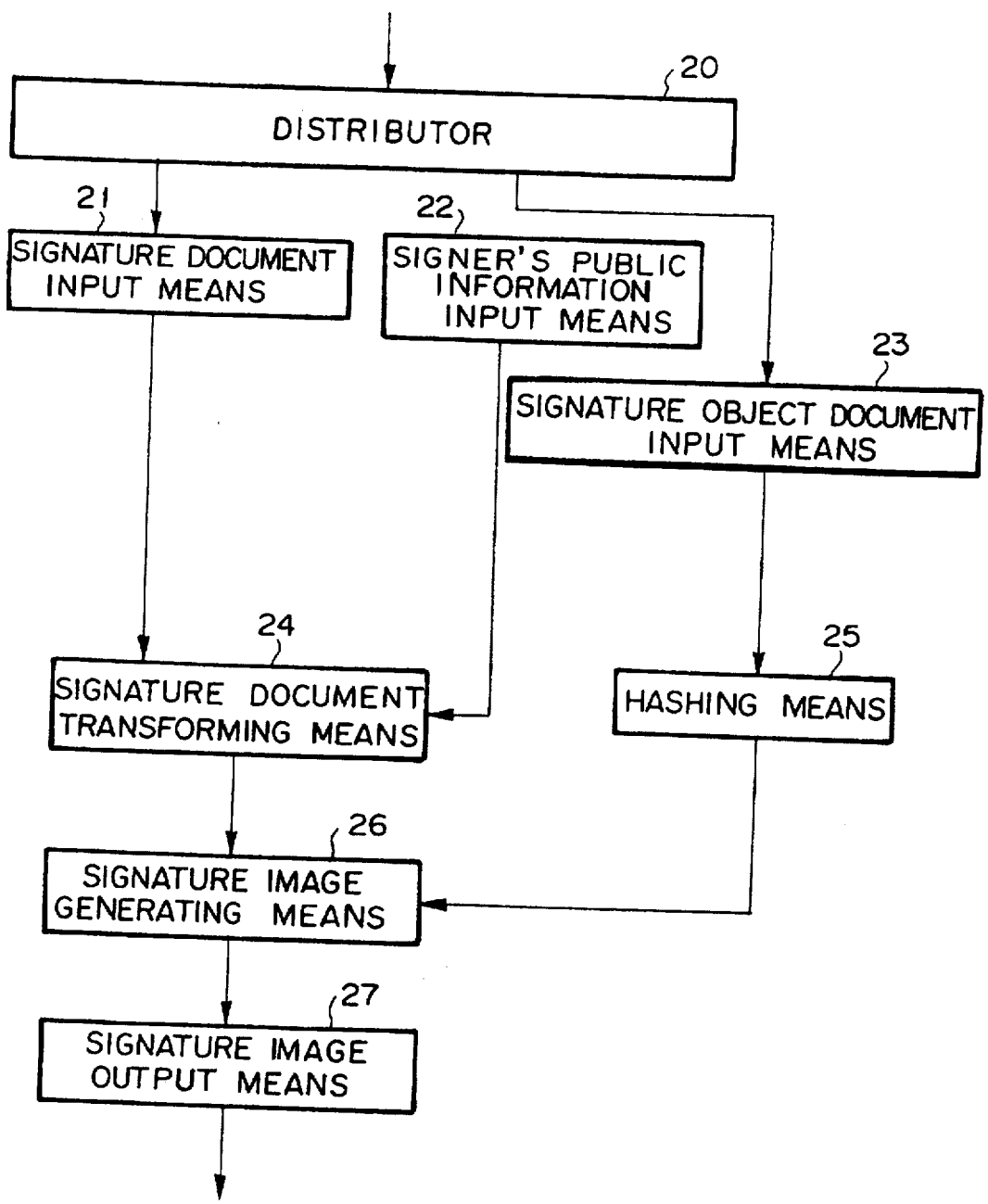

ELECTRONIC SIGNATURE METHOD AND APPARATUS

This application is a continuation of application Ser. No. 08/364,042, filed Dec. 27, 1994 now abandoned.

BACKGROUND OF THE INVENTION

1. Field of the Invention

The present invention relates to a method for signing an electronic document in the same manner as a plain paper document and an apparatus thereof.

2. Description of the Related Art

Conventional cryptosystems can be categorized as secret-key cryptosystems and public-key cryptosystems. An example of the latter is the RSA cryptosystem used for digital signatures. The RSA cryptosystem is disclosed in, for example, U.S. Pat. No. 4,405,829. The RSA cryptosystem is based on power-residual operations, which require a large number of arithmetic operations. In addition, the security of the RSA cryptosystem has not been strictly proved.

In the conventional signing method, the validity of a signature is judged and is determined and after that, a message that represents whether the signature is valid or invalid is supplied to a verifier.

In such a method, there are two drawbacks. As the first drawback, the user cannot know whether the validity of a signature was actually verified by the system or a message that represents the validity was forged and merely presents a display described "validity". As the second drawback, when the electronic signature is printed on a paper, the user cannot know and confirm whether or not the document was created by the signer and so whether or not the signature document is valid.

SUMMARY OF THE INVENTION

To solve such drawbacks of the related art reference, a first aspect of the present invention is an electronic signature method having a first step and a second step, the first step comprising inputting a signature image of a signer, a signature object document to be signed, and secret information of the signer, hashing the signature object document to be signed so as to generate a hash value, transforming the signature image with the hash value, and transforming the transformed signature image with the secret information so as to generate a signature document, and the second step comprising inputting the signature document, a signature object document to be signed, and signer's public information, transforming the signature document with the public information, hashing the signature object document to be signed so as to generate a hash value, and transforming the transformed signature document with the hash value so as to generate a signature image.

To solve such drawbacks of the related art reference, a second aspect of the present invention is an electronic signature apparatus, comprising first input means for inputting a signature image of a signer, second input means for inputting a signature object document to be signed, third input means for inputting secret information of the signer, hashing means for hashing the signature object document to be signed so as to generate a hash value, transforming means for transforming the signature image with the hash value, a signature document generating means for transforming the transformed signature image with the secret information so as to generate a signature document, and output means for outputting the signature document.

To solve such drawbacks of the related art reference, a third aspect of the present invention is an electronic signature apparatus, comprising first input means for inputting a signature document, second input means for inputting public information of a signer, third input means for inputting a signature object document to be signed, transforming means for transforming the signature document with the public information, hashing means for hashing the signature object document to be signed so as to generate a hash value, signature image generating means for transforming the transformed signature document with the hash value so as to generate a signature image, and output means for outputting the signature image.

According to the present invention, a signature image is encrypted with a combination of a public-key cryptosystem and a secret-key cryptosystem. The techniques of the public-key cryptosystem and hash function is described in "Theory of Modern Cryptographic Techniques (translated title)" (by Ikeno and Oyama, The Institute of Electronics, Information and Communication Engineers, Japan, 1986). Next, the secret-key cryptosystem and public-key cryptosystem will be described in brief by using symbols used in this description.

The secret-key cryptosystem is a technique where the same key is used for both encryption and decryption. There is the following relation between an encrypting function f1 and a decrypting function f2.

$$\forall M, K: f2(f1(M, K), K) = M$$

where M is a message; and K is a secret key.

Without secret key K, it is difficult to decrypt message M from an encrypted document C=f1(M, K).

In addition, there is the following relation among an encrypting function g1, a decrypting function g2, an encrypting (secret) key S, and a decrypting (public) key P.

$$\forall A: g2(g1(A, S), P) = A$$

where A is a message; S is an encrypting secret key; and P is a decrypting public key.

With one of the decrypting public key P and the encrypting secret key S, It is exceedingly difficult to obtain the other (S or P).

For the theory of cryptosystems, the following reference documents are available:

"Computer Communications Securities—Principles, Standard Protocols and Techniques", by Warwick Ford, PRT Prentice Hall, Inc.

"Theory of Modern Cryptographic Techniques (Translated title)", by Shinich Ikezawa and Kenji Oyama, The Institute of Electronics, Information and Communication Engineers, Japan.

"Introduction to Theory of Cryptographic Techniques (Translated title)", by Eiji Okamoto, Kyoritsu Publishing Company, 1993.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 1a is a flow chart showing a process for encrypting a signature document and FIG. 1b is a flow chart showing a process for decrypting the encrypted signature document and generating a signature image;

FIG. 2 is a block diagram showing an apparatus for encrypting a signature image and a signature object document to be signed according to the second aspect of the present invention; and FIG. 3 is a block diagram showing an electronic signature apparatus for decrypting an encrypted signature document according to a third aspect of the present invention.

DESCRIPTION OF PREFERRED EMBODIMENTS

Figure 1A:
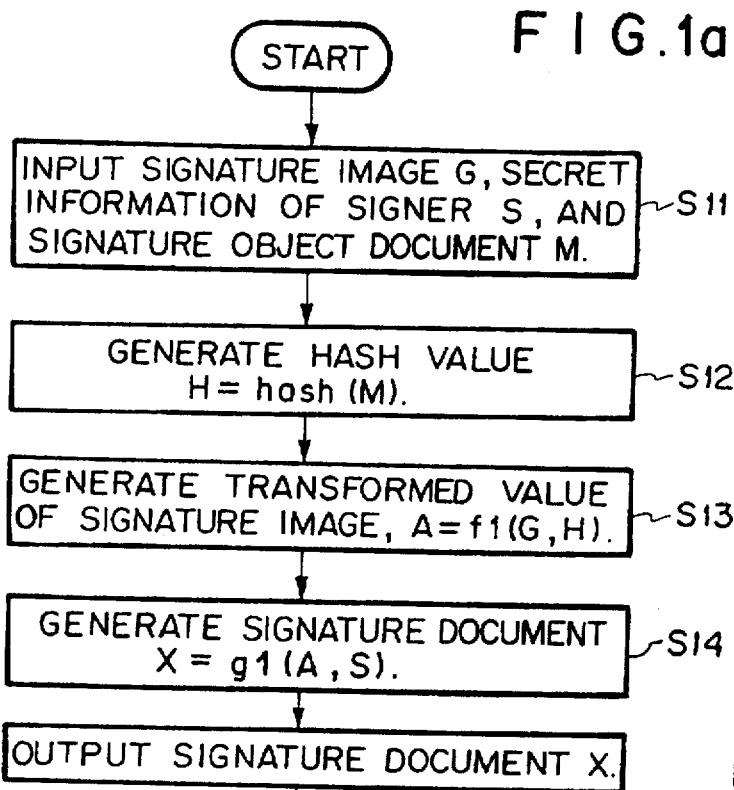
FIGS. 1a and 1b show process flows according to first, second, and third aspects of the present invention, where

Before explaining preferred embodiments of the present invention, the theory of operation of the present invention will be described.

According to the present invention, a signature image G is input as a message. The signature image is digital information of, for example, a print of a seal or a written signature. When a signature object document is signed, the signature image may be input through an input device such as a scanner or be stored as digital information in, for example, an electronic file.

Next, the method for generating a signature document will be described. At first, a hash value of a signature object document to be signed is generated. The signature object document to be signed is denoted by the signature object document M.

$$H = hash(M)$$

where "hash" is a hash function such as MD5 message-digest algorithm.

Thereafter, a signature image G is encrypted with a key of the hash value H corresponding to a secret-key cryptosystem. Then an encryption function A is transformed with the hash value H.

$$A = f1(G, H)$$

Thereafter, the encryption function A is encrypted with a secret-key S that a signer has in secret by using a method of a public-key cryptosystem. Then a encryption function X is showed by next expression.

$$X = g1(A, S)$$

where X is a signature document. Since X uses the hash value of the document M, a signature document depends on a signature object document to be processed and so if the signature object document, M, is different, the signature document, X, will be different from other signature documents. To generate a signature document, since the secret-key S of the signer is used, peoples other than the signer cannot correctly create the signature document X.

The signature is verified for a user authentication in the following manner. First, the signature document X is decrypted with the public-key P corresponding to a method of a public-key cryptosystem. So, a decryption function B is following.

$$B = g2(X, P)$$

When the signature generation and the verification thereof are correctly performed, the following relation is satisfied to the encryption function A.

$$A = B$$

Thereafter, the decryption function B is decrypted with a key of the hash value H of the document M corresponding to a method of the secret-key cryptosystem.

$$G' = f2(B, H)$$

When the signature generation and the verification thereof are correctly performed, the following relation is satisfied to the signature image G.

$$G' = G$$

Thus, the signature image G is restored. The result of the signature verification is output to the display of a computer or onto a sheet of paper so as to allow the user to verify and authenticate the signature.

If the secret key of the signer is incorrect or the signature document is used for other than the signature object document to be processed, the following relation takes place.

$$G' \neq G$$

Thus, the signature document cannot be restored and the signature image G cannot be restored. Generally, G' is a random image. Consequently, when the signature image is correctly restored, it is verified and authenticated that the signer signed to the signature object document.

According to the present invention, the signature document is generated and verified corresponding to the above-mentioned theory.

Next, preferred embodiments of the present invention will be described.

Figure 1B:
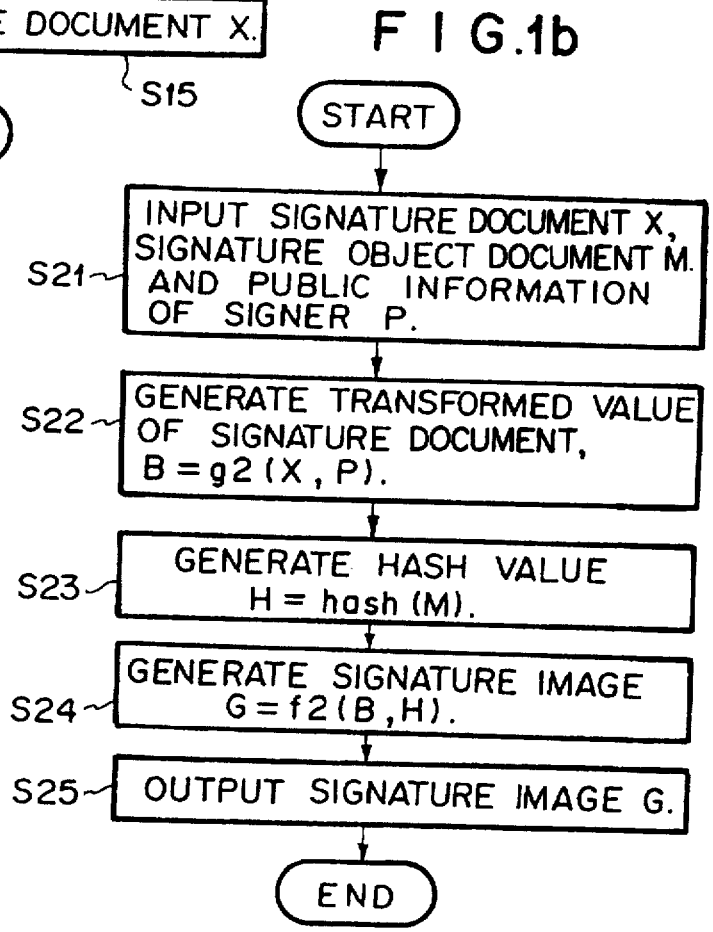

FIG. 1a and 1b show process flow charts according to first, second, and third aspects of the present invention. FIG. 2 is a block diagram showing an apparatus for encrypting a signature image and a signature object document to be signed according to the second aspect of the present invention. FIG. 3 is a block diagram showing an electronic signature apparatus for decrypting an encrypted signature document according to a third aspect of the present invention. Next, with reference to FIGS. 1a, 1b, 2, and 3, the first, second, and third aspects of the present invention will be described.

In FIG. 2, reference numeral 11 is a signature image input means. The signature image input means 11 inputs a signature image such as a print of a seal, a written signature, a fingerprint, or the like in digital form. The signature image G is sent to a signature image transforming means 15. Reference numeral 12 is a signature object document input means. The signature object document inputs means 12 inputs a signature object document M to be signed in digital form. The signature object document M to be signed is sent to a hashing means 14. Reference numeral 13 is a signer's secret information input means. The signer's secret information input means 13 inputs a secret key of a signer and sends it to a signature document generating means 16. Accordingly at step S11 of FIG. 1a, the signature image G, the secret information of signer S and the signature object document M are inputted.

When the hashing means 14 receives the signature object document to be signed from the signature object document input means 12, the hashing means 14 generates a hash value H of the signature object document M to be hashed with a predetermined hash function and sends the hash value H to the signature image transforming means 15. Accordingly at step S12 of FIG. 1a, the next step is to generate the hash value H to be hashed with the predetermined hash function.

The signature image transforming means 15 encrypts the signature image G received from the signature image input means 11 with a key of the hash value H received from the hashing means 14 corresponding to a method of a secret-key cryptosystem and sends the encrypted result to signature document generating means 16. Accordingly, at step S13 of FIG. 1a, a transform value is generated from the signature image G to a encryption function A with the hash value H according to the encrypted function A=f1(G, H).

The signature document generating means 16 receives the encrypted result from the signature image transforming means 15 and encrypts the encrypted result with a key received from the signer's secret information input means 13 corresponding to a method of a public-key cryptosystem and generates a signature document X. The generated signature document is sent to a signature document output means 17. Accordingly, at step S14 of FIG. 1a, a signature document is generated according to the encryption function X=g1(A, S).

The signature document output means 17 receives the signature document X from the signature document generating means 16 and outputs the signature document X to the outside of the apparatus (accordingly, step S15 of FIG. 1a outputs the signature document X). The encrypting apparatus of the electronic signature apparatus sends digital information of the signature document X and the signature object document M to be signed as composite digital information to a decrypting apparatus.

Next, with reference to FIG. 3, a decrypting apparatus that decrypts encrypted data according to the present invention will be described.

In FIG. 3, reference numeral 20 is a distributor that distributes the above-mentioned composite digital information. The composite digital information are seperated into the signature document X and the signature object document M by the distributor 20.

Reference numeral 21 is a signature document input means. The signature document input means 21 inputs the signature document X as digital information and sends it to a signature document transforming means 24. Reference numeral 22 is a signer's public information input means. The signer's public information input means 22 inputs a public decrypting key P of a signer and sends it to the signature document transforming means 24. Reference numeral 23 is a signature object document input means. The signature object document input means 23 inputs a signature object document M to be signed in digital form and sends it to a hashing means 25. Accordingly, at step S21 of FIG. 1b, the signature document X, the public decrypting key P, and the signature object document M are inputted.

The signature document transforming means 24 decrypts the signature document X received from the signature document input means 25 with the decrypting key received from the signer's public information input means 22 corresponding to a method of a public-key cryptosystem and sends the decrypted signature document B to a signature image generating means 26. Accordingly at step S22 of FIG. 1b, the signature document is transformed and the decrypted signature document (transformed value) B=g2(X, P) is generated.

The hashing means 25 receives the signature object document from the signature object document input means 23, generates a hash value H of the signature object document with a predetermined hash function, and sends the hash value H to the signature image generating means 26. Accordingly, at step 23 of FIG. 1b, the next step is to generate the hash value H=hash (M).

The signature image generating means 26 receives the decrypted information from the signature document transforming means 24, decrypts it with the hash value received from the hashing means 25 corresponding to a method of secret-key cryptosystem, restores a signature image, and sends the signature image to a signature image output means 27. Accordingly at step S24 of FIG. 1b, the signature image is generated according to the decryption function G=f2(B, H).

The signature image output means 27 receives the signature image G from the signature image generating means 26 and outputs it to the outside of the decryption apparatus. Accordingly at step S25 of FIG. 1b, the signature image G is outputted. After that, the signature image G is verified and authenticated by the user.

According to the present invention, an electronic signature that can be created only by a signer, that cannot be used for other than the signature object document to be processed, and that can be verified as a result of signature verification of a signature image is accomplished. According to the present invention, since the verified result is an image such as a print of a seal and a signature, the verifier can easily verify the validity of the signature image. In addition, since a signature image and a signature object document are separately processed and combined at sending to the decryption apparatus, they can be effectively printed.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An electronic signature method having an encryption step and a verification step, wherein said encryption step comprises the steps of:

(a) inputting a signature image of a signer, a signature object document to be signed, and secret information of the signer;

(b) hashing the signature object document to generate a hash value;

(c) encrypting the signature image with the hash value generated by said hashing step (b); and (d) encrypting the encrypted signature image in accordance with the secret information to generate a signature document;

and wherein said verification step comprises the steps of:

(e) inputting the signature document, the signature object document, and public information of the signer;

(f) decrypting the signature document to generate a decrypted signature document in accordance with the public information;

(g) hashing the signature object document to generate a hash value; and (h) decrypting the decrypted signature document with the hash value generated by said hashing step (g) to generate a restored signature image.

2. The electronic signature method as set forth in claim 1, wherein the step (c) is performed by encrypting the signature image with the hash value corresponding to a method of a secret-key cryptosystem.

3. The electronic signature method as set forth in claim 1, wherein the step (d) is performed by encrypting the encrypted signature image with the secret information corresponding to a method of a public-key cryptosystem.

4. The electronic signature method as set forth in claim 1, wherein the step (f) is performed by decrypting the signature document with the public information corresponding to a public-key cryptosystem.

5. The electronic signature method as set forth in claim 1, wherein the step (h) is performed by decrypting the decrypted signature document with the hash value corresponding to a secret-key cryptosystem.

6. The electronic signature method as set forth in claim 1, wherein the signature image is a print of a seal, a written signature, or a fingerprint.

7. An electronic signature apparatus, comprising:

first input means for inputting a signature image of a signer;

second input means for inputting a signature object document to be signed;

third input means for inputting secret information of the signer;

hashing means for hashing the signature object document to generate a hash value;

encrypting means for encrypting the signature image with the hash value generated by said hashing means;

signature document generating means for encrypting the encrypted signature image in accordance with the secret information to generate a signature document; and output means for outputting the signature document.

8. The electronic signature apparatus as set forth in claim 7, wherein said encrypting means encrypts the signature image with the hash value corresponding to a secret-key cryptosystem.

9. The electronic signature apparatus as set forth in claim 7, wherein said signature document generating means encrypts the encrypted signature image with the secret information corresponding to a public-key cryptosystem to generate the signature document.

10. The electronic signature apparatus as set forth in claim 7, wherein the signature image is a print of a seal, a written signature, or a fingerprint.

11. An electronic signature apparatus, comprising:

first input means for inputting a signature document;

second input means for inputting public information of a signer;

third input means for inputting a signature object document to be signed;

decrypting means for decrypting the signature document in accordance with the public information;

hashing means for hashing the signature object document to generate a hash value;

image generating means for decrypting the decrypted signature document with the hash value to generate a signature image; and output means for outputting the signature image.

12. The electronic signature apparatus as set forth in claim 11, wherein said decrypting means decrypts the signature document with the public information corresponding to a public-key cryptosystem.

13. The electronic signature apparatus as set forth in claim 11, wherein said image generating means decrypts the decrypted signature document with the hash value corresponding to a secret-key cryptosystem to generate the signature image.

14. An electronic signature apparatus, comprising:

first input means for inputting a signature image of a signer;

second input means for inputting a signature object document to be signed;

third input means for inputting secret information of the signer;

first hashing means for hashing the signature object document to generate a first hash value;

encrypting means for encrypting the signature image with the first hash value;

signature document generating means for encrypting the encrypted signature image in accordance with the secret information to generate a signature document;

first output means for outputting the signature document and the signature object document;

fourth input means for inputting the signature document;

fifth input means for inputting public information of the signer;

sixth input means for inputting the signature object document;

decrypting means for decrypting the signature document in accordance with the public information;

second hashing means for hashing the signature object document to generate a second hash value;

image generating means for decrypting the decrypted signature document with the second hash value to generate a restored signature image; and second output means for outputting the restored signature image.

* * * * *